(12) United States Patent
Solomon et al.

(10) Patent No.: US 9,424,742 B1
(45) Date of Patent: Aug. 23, 2016

(54) NOTIFICATION SYSTEM, METHOD, AND COMPUTER APPLICATION BASED ON DECISION RULES FOR EVALUATING A PLURALITY OF UTILITY METER CONDITIONS

(71) Applicant: Southern Company Services, Inc., Atlanta, GA (US)

(72) Inventors: Arnold Cory Solomon, Covington, GA (US); Gregory Ray Floyd, McDonough, GA (US)

(73) Assignee: Southern Company Services, Inc., Atlanta, GA (US)

( * ) Notice: Subject to any disclaimer, the term of this patent is extended or adjusted under 35 U.S.C. 154(b) by 197 days.

(21) Appl. No.: 13/873,565

(22) Filed: Apr. 30, 2013

(51) Int. Cl.
*G08C 15/06* (2006.01)
*G08C 19/16* (2006.01)

(52) U.S. Cl.
CPC ..................... *G08C 19/16* (2013.01)

(58) Field of Classification Search
CPC ... G01D 4/002; G01D 4/004; H04Q 2209/60; Y02B 90/241; Y02B 90/242; Y04S 20/322
USPC .................................................. 340/870.03
See application file for complete search history.

(56) References Cited

U.S. PATENT DOCUMENTS

| | | | | |
|---|---|---|---|---|
| 5,086,292 A * | 2/1992 | Johnson | ................ | G01F 15/007 324/110 |
| 6,529,883 B1 * | 3/2003 | Yee et al. | ........................ | 705/63 |
| 7,830,874 B2 * | 11/2010 | Cornwall et al. | ............. | 370/389 |
| 8,176,527 B1 * | 5/2012 | Njemanze et al. | ................. | 726/2 |
| 8,589,452 B2 * | 11/2013 | Ovsyannikov et al. | ....... | 707/805 |
| 2008/0042874 A1 * | 2/2008 | Rogai | ........................ | 340/870.03 |
| 2008/0046387 A1 * | 2/2008 | Gopal et al. | ................... | 705/412 |
| 2009/0187284 A1 * | 7/2009 | Kreiss et al. | ................... | 700/291 |
| 2009/0243866 A1 * | 10/2009 | Murphy | ................. | G06Q 50/06 340/635 |
| 2010/0312593 A1 * | 12/2010 | Johnston et al. | ................... | 705/7 |
| 2011/0225072 A1 * | 9/2011 | Sewell | ............................ | 705/30 |
| 2012/0101910 A1 * | 4/2012 | Neri-Badillo | ................... | 705/18 |
| 2012/0169512 A1 * | 7/2012 | Carpman et al. | ......... | 340/870.16 |
| 2012/0197552 A1 * | 8/2012 | Robinson et al. | ............... | 702/50 |
| 2012/0203388 A1 * | 8/2012 | Diluciano et al. | ............ | 700/292 |
| 2012/0232915 A1 * | 9/2012 | Bromberger | ........... | G01D 4/004 705/1.1 |
| 2013/0116941 A1 * | 5/2013 | Lie-Nielsen et al. | ........... | 702/46 |
| 2013/0262197 A1 * | 10/2013 | Kaulgud et al. | ............. | 705/14.1 |
| 2013/0293390 A1 * | 11/2013 | Le Buhan | .............. | G01D 4/004 340/870.02 |
| 2014/0201315 A1 * | 7/2014 | Jacob et al. | ................... | 709/217 |

* cited by examiner

*Primary Examiner* — Benjamin C Lee
(74) *Attorney, Agent, or Firm* — Thomas | Horstemeyer, LLP

(57) ABSTRACT

Various methods and systems are directed to a meter alert system that provides surveillance of meters and other components of a utility system. The meter alert system obtains, via a user interface, specification of one or more meter conditions among a list of meter conditions. The meter alert system generates a rule for a utility metering device according to the meter conditions, wherein the rule is associated with a utility metering device identifier of the utility metering device. The meter system executes the rule, wherein an execution of the rule generates an alert in response to at least one of the first meter condition being satisfied or the second meter condition being satisfied. The meter alert system transmits a notification message in response to the alert being generated.

18 Claims, 7 Drawing Sheets

NOTIFICATION SYSTEM, METHOD, AND COMPUTER APPLICATION BASED ON DECISION RULES FOR EVALUATING A PLURALITY OF UTILITY METER CONDITIONS

BACKGROUND

A utility metering and computing environment may involve storage, analysis and manipulation of large amounts of data. The utility metering and computing environment may be tasked with monitoring usage information for millions of utility metering devices transmitting usage data on a periodic or real-time basis. The various utility metering devices may be associated with various customer accounts, account types, service plans, and other categories.

Utility outage issues, meter functionality issues, meter theft, unlawful meter manipulation, meter maintenance issues, or any other issue arising from the operation of one or more utility metering devices may occur in the utility computing environment. Investigators who are responsible for overseeing the operation of utility metering devices are responsible for addressing at least these utility operation issues. Investigators manually obtain meter surveillance information, meter status changes, and other information related to the use of utility meter devices.

BRIEF DESCRIPTION OF THE DRAWINGS

Many aspects of the present disclosure may be better understood with reference to the following drawings. The components in the drawings are not necessarily drawn to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of systems and methods related to a meter alert system that provides an automated system that monitors multiple utility metering devices for events that may indicate meter issues. The meter alert system provides surveillance of utility metering devices and generates alerts in response to particular meter events. The meter alert system may be referred to as a "Meter Detective." Meter issues that are subject to monitoring may include utility outage issues, meter functionality issues, meter theft, unlawful meter manipulation, meter maintenance issues, or any other issue arising from the operation of one or more utility metering devices. An investigator may use the meter alert system to monitor customized events and receive one or more notification messages in response to an occurrence of an event and/or a condition.

The investigator may use a portal or any other user interface provided by the meter alert system to customize the monitoring of events and the generation of notification messages. According to various embodiments, an investigator identifies a utility metering device of interest to designate the utility metering device as a target utility metering device. The investigator may select one or more conditions and submit one or more parameters to generate a rule to facilitate a monitoring of the target utility metering device. A rule may be referred to as a "watch expression" that is customizable by an investigator or on behalf of the investigator.

Figure 1:
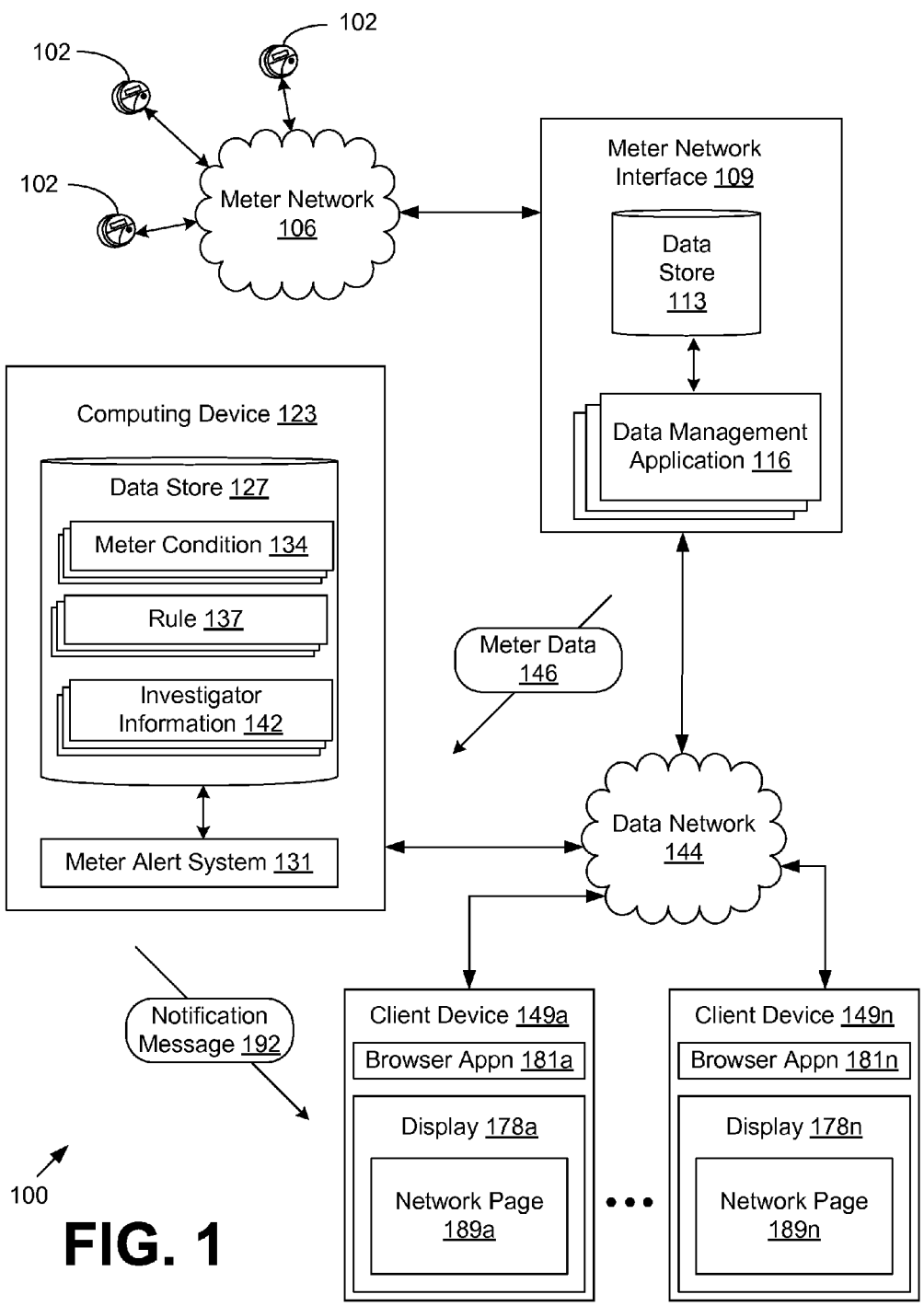
FIG. 1 is a drawing of a utility metering and computing environment in which a meter alert system may be implemented according to various embodiments of the present disclosure.

Referring to FIG. 1, shown is a drawing of a utility metering and computing environment 100, according to various embodiments of the present disclosure. The utility metering and computing environment 100 comprises one or more utility metering devices 102. Non-limiting examples of utility metering devices include smart meters, automated reconnect/disconnect (RCDC) meters, advanced metering infrastructure (AMI) meters, or any other devices that are operable to monitor consumption of utility resources. A utility metering device may be operable to measure and store utility consumption data and/or signal events. Non-limiting examples of signal events include a power outage indication, a meter tamper indication, a low voltage indication, a power restore indication, or any other indication of meter status. In some embodiments, a utility metering device comprises a device that monitors or tracks operations of portions of a utility system. For example, the utility metering device may monitor the operations of various utility infrastructure components such as, for example, capacitor banks, switch components, or any other physical device that effectuates the operation of the utility system. In other embodiments, the utility metering device monitors patterns in utility usage at a consumer site to identify improper usage, defects in a metering device, meter theft, or any other issue associated with utility usage at a customer site. Each utility metering device may be configured for bi-directional communication via a meter network 106.

The meter network 106 may comprise, for example, the Internet, intranets, wide area networks (WANs), local area networks (LANs), wireless networks, other suitable networks, or any combination of two or more such networks. The meter network 106 may comprise one or more base stations that relay data to and from the utility metering devices 102.

The utility metering and computing environment 100 may comprise a meter network interface 109. The meter network interface 109 may comprise, for example, a server computer or any other system providing computing capability. Alternatively, the meter network interface 109 may employ a plurality of computing devices that may be arranged, for example, in one or more server banks, computer banks, or other arrangements. Such computing devices may be located in a single installation or may be distributed among many different geographical locations. For example, the meter network interface 109 may include a plurality of computing devices that together may comprise a cloud computing resource, a grid computing resource, and/or any other distributed computing arrangement. In some cases, the meter network interface 109 may correspond to an elastic computing resource where the allotted capacity of processing, network, storage, or other computing-related resources may vary over time.

Various applications, application layers, software modules, and/or other functionality may be executed in the meter network interface 109 according to various embodiments. Also, various data is stored in a data store 113 that is accessible to the meter network interface 109. The data store 113 may be representative of a plurality of data stores 113 as can be appreciated. The data stored in the data store 113 is associated with, for example, the operation of the various applications, application layers, software modules, and/or functional entities described below.

The components executed on the meter network interface 109 include, for example, one or more data management applications 116 and other applications, services, processes, systems, engines, or functionality not discussed in detail herein. The data management applications 116 may perform various functions such as information management, network management, health diagnostics operations, and/or business management. The data stored in the data store 113 includes, for example, data received from utility metering devices 102, data sent or to be sent to utility metering devices 102, data relating to one or more signal events, data relating to the administration of utilities to customers, or any other data.

The utility metering and computing environment 100 may comprise a computing device 123. The computing device 123 may comprise, for example, a server computer or any other system providing computing capability. Alternatively, the computing device 123 may employ a plurality of computing devices that may be arranged, for example, in one or more server banks, computer banks, or other arrangements. Such computing devices may be located in a single installation or may be distributed among many different geographical locations. For example, the computing device 123 may include a plurality of computing devices that together may comprise a cloud computing resource, a grid computing resource, and/or any other distributed computing arrangement. In some cases, the meter network interface 109 may correspond to an elastic computing resource where the allotted capacity of processing, network, storage, or other computing-related resources may vary over time.

Various applications, application layers, software modules, and/or other functionality may be executed in the computing device 123 according to various embodiments. Also, various data is stored in a data store 127 that is accessible to the computing device 123. The data store 127 may be representative of a plurality of data stores 127 as can be appreciated. The data stored in the data store 127 is associated with, for example, the operation of the various applications, application layers, software modules, and/or functional entities described below.

The components executed on the computing device 123 include, for example, a meter alert system 131 and other applications, services, processes, systems, engines, or functionality not discussed in detail herein. The meter alert system 131 may perform various functions to facilitate a monitoring of one or more utility metering devices 102 and notification message generation. The meter alert system 131 may provide a portal or any other user interface for an investigator to customize a monitoring of one or more utility metering devices 102.

The data stored in the data store 113 includes, one or more meter conditions 134, one or more rules 137, investigator information 142, or any other data. A meter condition 134 may be expressed as a binary result such that the condition may or may not be satisfied. Meter conditions 134 may comprise meter events such as, for example, a power failure or a power restoration. A meter condition 134 may comprise meter readings such as, for example, a particular utility usage amount, a duration of time since a previous meter reading, or whether a meter reading was received. Meter conditions 134 may comprise a meter theft condition such as, for example, a reverse rotation condition, or a meter tamper condition. Meter conditions 134 may comprise meter hardware conditions such as, for example, a meter memory error or a cyclic redundancy check error. Some meter conditions are associated with one or more input parameters. An input parameter may be a threshold reading amount, a threshold duration of time amount, a percentage amount, or any other parameter. Some parameters may comprise a correlation utility metering device identifier parameter. In this case, a meter condition may depend at least upon one or more other utility metering devices 102. Meter conditions are discussed in further detail below with respect to at least FIG. 2.

The data store 127 may further comprise one or more rules 137. A rule may comprise an expression that is based on one or more meter conditions 134. In various embodiments, a user may select meter conditions 134 to build a rule. In this respect, a rule 137 may be generated to monitor specific events such as meter theft, utility outages, meter malfunctions, unusual meter activity, or any other event. A rule 137 may be customized based at least in part on the meter conditions 134 included in the rule. Based on which meter conditions 134 are selected, a rule 137 may be customized to automatically monitor theft, utility outages, unusual utility usage, etc. The data store 127 may also comprise investigator information 142. Investigator information 142 may comprise, for example, one or more addresses related to an investigator, an investigator identifier for identifying a particular investigator, investigator preferences for receiving notification messages, or any other investigator-related information.

The utility metering and computing environment 100 may comprise a data network 144. The data network 144 may comprise, for example, the Internet, intranets, wide area networks (WANs), local area networks (LANs), wireless networks, other suitable networks, etc., or any combination of two or more such networks. The meter network interface 109 may be in communication with other components in the utility metering and computing environment 100 via the data network 144. In addition, the computing device 123 may be in communication with other components in the utility metering and computing environment 100 via the data network 144. In various embodiments, the computing device 123 may receive meter data 146 from the meter network interface 109 via the data network 144. The meter data 146 may comprise, for example, meter readings, utility metering device identifiers, status information regarding one or more utility metering devices 102, or any other information relating to one or more utility metering devices 102.

The utility metering and computing environment 100 may comprise one or more client devices 149*a-n*. A client device 149 may send and receive data via the data network 144 via a wired connection or a wireless connection. Each client device 149 may comprise, for example, a processor-based system such as a computer system. Such a computer system may be embodied in the form of a desktop computer, a laptop computer, personal digital assistants, cellular telephones, smartphones, web pads, tablet computer systems, a telephone, alpha numeric pager, a smart device, or other devices with like capability. Each client device 149 may include one or more displays 178*a-n*. Each display 178 may comprise, for example, one or more devices such as liquid crystal displays (LCDs), gas plasma-based flat panel displays, organic light emitting diode (OLED) displays, LCD projectors, or other types of display devices. In some embodiments, the displays 178 may correspond to touchscreen displays.

Each client device 149 may be configured to execute various applications such as a browser 181*a-n*, one or more dedicated applications and/or other applications. The browser 181 or any other dedicated application may be executed in a client device 149 to access, for example, data generated by the computing device 123 or data stored in the computing device 123. For example, a client device 149 may render for display one or more network pages 189 received from the computing device 123. In addition, a client device 149 may receive a notification message 192 from the computing device 123. A notification message 192 may be generated by the meter alert system 131.

Next, a general description of the operation of the various components of the utility metering and computing environment 100 is provided. To begin, utility metering devices 102 monitor and/or track a consumption of a utility resource with respect to a customer. A utility metering device 102 may transmit meter readings via the meter network 106 to a meter network interface 109. For example, a meter reading may be forwarded to one or more base stations within the meter network 106 and then subsequently forwarded to one or more meter network interfaces 109. A utility metering device 102 may also forward any information relating to the status of the utility metering device 102, control signals relating to the operation of the utility metering device 102, any measurement data collected by the utility metering device 102, or any other information relating to the operation of the utility metering device 102. Information received by a utility metering device 102 may be stored in a data store 113 of the meter network interface 109.

Meter data 146 may be transmitted from one or more meter network interfaces 109 to a computing device 123 via the data network 144. The meter data 146 may be transmitted at periodic intervals, in real-time, and/or in response to a request for the meter data 146. Thus, the meter data 146 may be pushed to a data store 127 of the computing device 123. The meter data 146 may comprise, for example, information relating to one or more utility metering devices 102 or measurements generated by one or more utility metering devices 102. By receiving the meter data 146, the computing device 123 tracks and stores information regarding utility metering devices 102.

The meter alert system 131 is executed in the computing device 123 to facilitate an automated and customized monitoring of the utility metering devices 102. The meter alert system 131 may generate and encode a user interface and transmit the encoded user interface to one or more client devices 149. For example, the meter alert system 131 may generate a user interface according to a hypertext transfer protocol format. Investigators may access the user interface via a client device 149. For example, the meter alert system 131 may provide a user interface such as a portal to allow an investigator to configure an automated and customized monitoring of one or more utility meter devices 102.

The meter alert system 131 may provide a monitoring of a utility metering device 102 using one or more meter conditions 134. A list of meter conditions may be stored in the computing device 123. Each meter condition 134 within the list represents a condition that may or may not be satisfied by any of the utility metering devices 102. The occurrence of an event relating to a utility metering device 102 may result in a meter condition 134 being satisfied. Each meter condition 134 may be defined by an administrator of the meter alert system 131. New or update meter conditions may be generated by an administrator and the administrator may insert the additional meter conditions into the list of meter conditions.

Thus, additional meter conditions 134 may be added to the list of meter conditions stored in the data store 127. Meter conditions 134 may relate to meter readings generated by the utility metering device 102 and to operational statuses of the utility metering device 102.

The meter alert system 131 may provide a user interface for allowing a user to select one or more meter conditions 134 to generate a rule 137 for a particular utility metering device 102. A rule 137 may be expressed in terms of a satisfaction of one or more meter conditions 134. A rule 137 may comprise Boolean operators that operate on multiple meter conditions 134. In this respect, a rule 137 may be formatted as an expression containing meter conditions, Boolean operators, or any other parameters. Moreover, an application of a rule 137 may generate a binary result such as, for example, a true/false result, a satisfied/unsatisfied result, or a positive/negative result. The meter alert system 131 may generate a user interface to allow a user to select one or more meter conditions 134 for defining a rule 137 to facilitate an automated and customized monitoring of one or more utility metering devices 102.

In addition, investigator information 142 may be used by the meter alert system 131 to facilitate the generation of a rule 137. The investigator information 142 may comprise an identifier for a unique investigator, contact information for the investigator, a destination associated with the investigator, or any other preferences relating to an investigator.

After the meter alert system 131 generates a rule 137 by receiving selections or information obtained by a user, the meter alert system 131 executes the rule 137. Through the execution of a rule 137, the meter alert system 131 periodically analyzes those meter conditions 134 included in a particular rule 137 to generate a result for the rule 137. The execution of a rule 137 may result in a generation of an alert. In response to the alert, the meter alert system 131 generates a notification message 192 to be transmitted to one or more client devices 149.

The meter alert system 131 may obtain from a user parameters associated with the generation and transmission of a notification message 192. A user may specify a destination for notification messages 192 to be transmitted in response to an alert generated by the execution of a rule 137. For example, the destination may comprise an identifier or location of a particular client device 149. The destination may be referenced by an address such as, for example, a telephone number, an Internet Protocol (IP) address, an e-mail address, or any other address associated with receiving private messages. The notification message 192 may be transmitted to an investigator according to the destination. For example, the investigator may receive the notification message 192 via e-mail, a private message, a short messaging service (SMS) text message, or a phone call.

Figure 2:
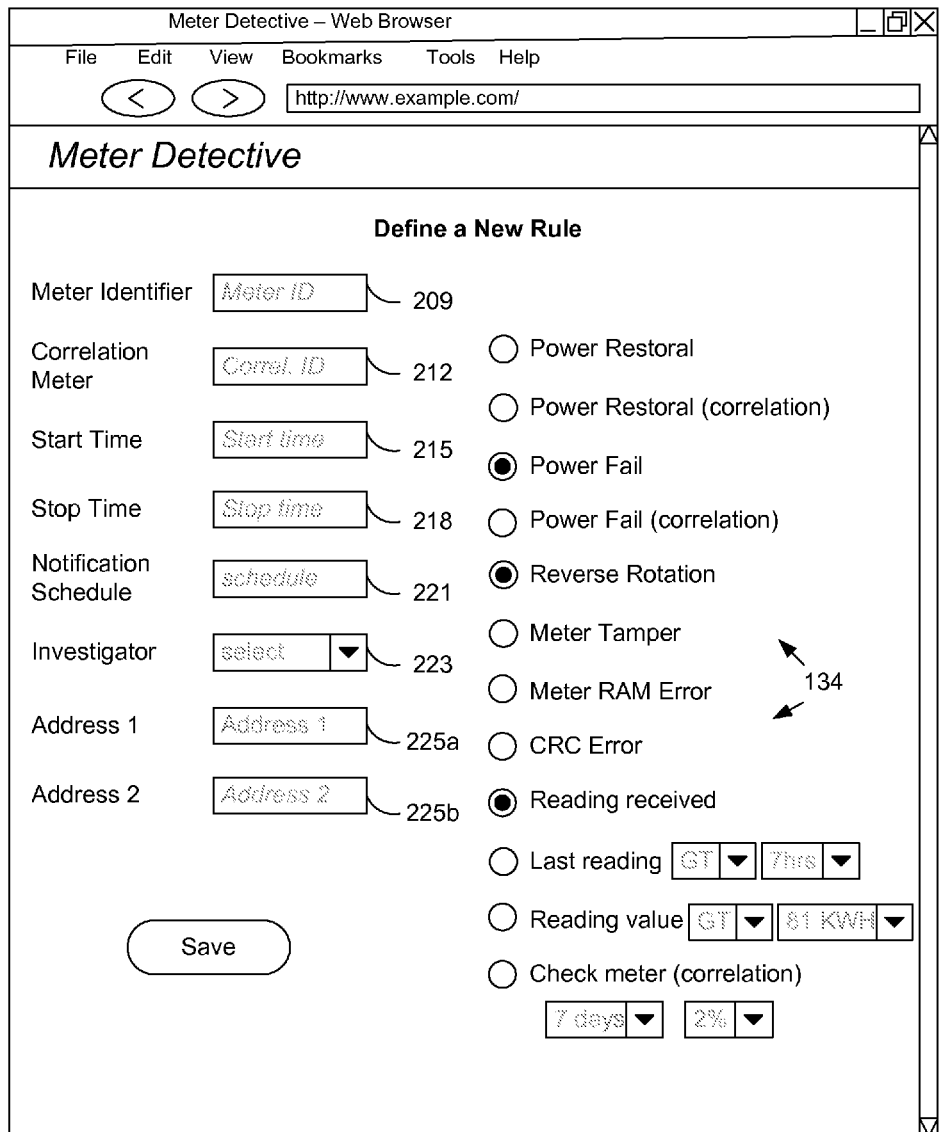
FIG. 2 is an example of a user interface generated in the utility metering and computing environment of FIG. 1, according to various embodiments of the present disclosure.

Referring next to FIG. 2, shown is a user interface generated in the utility metering and computing environment 100 of FIG. 1, according to various embodiments of the present disclosure. The non-limiting example of FIG. 2 depicts a user interface that is expressed as a portal or network page 189*a* rendered in a client device 149 (FIG. 1). The user interface may be generated by a meter alert system 131 (FIG. 1). The user interface may be encoded by the meter alert system 131 according to any transmission protocol or transfer protocol and transmitted over a data network 144 (FIG. 1) to a client device 149. The client device 149 may decode the user interface and render it for display.

The user interface facilitates a customization of a rule 137 (FIG. 1) by a user. The user may be an investigator or any other individual who is customizing the rule 137 for an investigator. The user interface facilitates obtaining various user inputs such as, for example, a meter identifier 209, the correlation meter identifier 212, a start time 215, a stop time 218, a notification schedule 221, an investigator identifier 223, one or more addresses 225a-b, investigator information 142 (FIG. 1), or any other information. A user may specify parameters for a particular user input using a form object or any other user interface component such as, for example, a text box field, a drop-down menu, the checkbox form, or a radio button form.

The meter identifier 209 may comprise an identifier associated with a particular utility metering device 102 (FIG. 1). By specifying a meter identifier 209, the meter alert system 131 associates the customized rule 137 to the particular utility metering device 102. In this respect, the meter identifier 209 identifies the target utility metering device 102 to which the rule 137 applies. The correlation meter identifier 212 may comprise an identifier associated with a particular correlation utility metering device. A correlation utility metering device may be a utility metering device 102 that is relatively proximate to or near the target utility metering device 102. For example, the correlation utility metering device may be a utility metering device 102 that is in the same building complex as the target utility metering device 102. The correlation utility metering device may be selected such that a power outage or any other localized event that may affect a meter operation would be likely to affect both the correlation utility metering device and the target utility metering device 102. By using a correlation utility metering device, the risk of receiving false alerts associated with the target utility metering device is reduced.

The start time 215 and stop time 218 may represent time parameters associated with the execution of a rule 137. For example, the start time 215 and stop time 218 may represent a period of time for when the rule 137 is to be executed. For example, an investigator may desire to monitor a particular utility metering device 102 for the first month that the particular utility metering device 102 is associated with a new customer. The notification schedule 221 may comprise dates, days of the week, or any other scheduling parameter that specifies when the rule 137 is to be executed. For example, an investigator may desire to execute the rule 137 for particular days of the week or particular times of the year.

The investigator identifier 223 may comprise a name or any other alphanumeric identifier associated with an investigator or a group of investigators. An investigator who desires to monitor a particular utility metering device 102 may customize a rule 137 and associate the execution of that rule 137 to the investigator via the investigator identifier 223.

The address 225 may comprise an address for a destination relating to the transmission of a notification message 192 (FIG. 1). The execution of the rule 137 may generate an alert and in response to the alert, the meter alert system 131 may generate and transmit a notification message 192, where the notification message 192 is transmitted according to the address 225. In this respect, the address 225 may comprise an e-mail address, a telephone number, a destination identifier, etc. Although not explicitly shown in the non-limiting example of FIG. 2, a user may specify, via the user interface, any other information or instructions regarding the transmission of a notification message 192. This may include, for example, notes, customer information relating to the customer of the target utility metering device 102, or any other information.

The meter alert system 131 may obtain a specification of a meter condition 134 (FIG. 1) to generate a customized rule 137. For example, the meter alert system 131 may generate a user interface that presents a list of meter conditions 134 that a user may select. A user may select one or more of the meter conditions 134 to generate a particular rule 137. A user may define customized rules 137 based on which meter conditions 134 he/she selects.

Some meter conditions 134 may comprise meter events such as, for example, a power fail condition, a power restoral condition, or a reading received condition. A power fail condition may reflect an event that causes a particular utility metering device 102 to generate a reading that reflects a power outage. A power fail condition may also reflect an event where the utility metering device 102 disassociates from a meter network 106 (FIG. 1). That is to say, the utility metering device 102 may disconnect or go off the air from the meter network 106. A power restoral condition may reflect an event that causes a particular utility metering device 102 to associate or join a meter network 106. A power restoral condition may result in a utility metering device 102 coming online and obtaining meter readings after the utility metering device 102 is offline. A reading received condition may reflect a condition where the utility metering device 102 has generated any meter reading.

Some meter conditions 134 comprise conditions reflecting the operational status of a utility metering device 102. For example, an operational status condition may comprise a meter memory error, a cyclic redundancy check (CRC) error, or any other hardware or software meter error. Meter conditions 134 may also comprise theft related conditions such as, for example, a reverse rotation condition or a meter tamper condition. A reverse rotation condition may indicate that a particular utility metering device 102 has been physically modified or rotated. A meter tamper condition may indicate that a particular utility metering device 102 has been physically relocated and/or removed.

Some meter conditions 134 may be associated with one or more input parameters. An input parameter may comprise an operator parameter and/or or an operand parameter. For example, a last reading condition may comprise an operator parameter such as a greater than (GT) operator, a less than (LT) operator, an equal to (EQ) operator, or any other operator. A last reading condition may also comprise an operand such as, for example, a duration of time. In this respect, the operand parameter of a meter condition 134 may be a threshold amount that defines whether a meter condition is satisfied. In the non-limiting example of FIG. 2, a last reading condition has been specified by a user that may be satisfied in response to the last reading of a particular utility metering device 102 being greater than seven hours. To this end, the last reading condition of FIG. 2 is satisfied in response to the previous reading of a target utility metering device 102 being more than seven hours after a current point in time. A user may use this condition to customize a rule 137 specific to a utility metering device 102 that has generated a relatively recent meter reading.

As another non-limiting example, a meter condition 134 relating to a reading value may comprise one or more input parameters regarding a power reading amount. In the non-limiting example of FIG. 2, a reading value that is greater than 81 kWh satisfies the reading value condition, where "greater than" is an operator and "81 kWh" is an operand. The operand may be compared to an initial reading amount value (kWh) that is stored at the time when the condition was first defined.

Some meter conditions 134 may be correlation meter conditions such that the meter condition 134 depends on a correlation utility metering device. The use of correlation meters results in a reduced risk of false alerts. When customizing a rule 137, a user may specify a correlation meter identifier 212 to apply to those meter conditions that are correlation meter conditions. In the non-limiting example of FIG. 2, the correlation meter conditions include a power restoral (correlation) condition, a power fail (correlation) condition, and a check meter (correlation) condition. The power restoral (correlation) condition may be satisfied in response to the target utility metering device 102 satisfying a power restoral condition and the correlation utility metering device also satisfying the power restoral condition. However, the power restoral (correlation) condition is not satisfied if the target utility metering device 102 satisfies the power restoral condition and the correlation utility metering device does not satisfy the power restoral condition.

The power fail (correlation) condition may be satisfied in response to the target utility metering device 102 satisfying a power fail condition and the correlation utility metering device also satisfying the power fail condition. However, the power fail (correlation) condition is not satisfied if the target utility metering device 102 satisfies the power fail condition and the correlation utility metering device does not satisfy the power fail condition. Thus, to account for those cases where a meter condition 134 is falsely satisfied due to an aberration or a glitch, correlation meter conditions may be used to increase the likelihood that a meter condition 134 is accurately satisfied.

Some meter conditions 134 such as, for example, the check meter (correlation) condition, may comprise correlation meter conditions that are associated with additional parameters. The check meter (correlation) condition may be satisfied in response to the target utility metering device 102 providing a meter reading that deviates from a correlation utility metering device with respect to a particular percentage and/or over the course of a threshold duration of time. With regard to the check meter (correlation) condition of the non-limiting example of FIG. 2, if the amount of power consumed by the target utility metering device 102 deviates from the correlation utility metering device by at least 2% over the course of seven days, then the check meter (correlation) condition satisfied.

By selecting one or more meter conditions 134, a user may customize a rule 137 for a target utility metering device 102. Based on those selected meter conditions 134 and the manner in which they are satisfied, an execution of the customized rule 137 may result in an alert where, in response to the alert, the meter alert system 131 generates a notification message 192 indicating that the rule 137 is satisfied.

In the non-limiting example of FIG. 2, an investigator may manually define a new rule 137 by selecting any number and any combination of meter conditions 134. The investigator may define a pattern of meter conditions to monitor specific events such as, for example, a meter theft event, a missing meter event, a meter swapping event, a meter bypassed by jumper event, a general blanket case, etc. A missing meter event may be expressed as a missing meter rule 137 that comprises a power fail condition 134 and a last reading greater than a specified duration of time condition 134. A meter swapping event may be expressed as a meter swapping rule 137 that comprises a power restoral condition 134 and a reading received condition 134. A meter bypassed by jumper event may be expressed as a meter bypassed by jumper rule 137 that comprises a power fail condition 134, a power restoral condition 134, and a reading value less than a specified value registered for a specified period of time condition 134. A blanket case rule 137 may be generated to provide a general monitoring of the target utility metering device 102. A blanket case rule 137 may comprise a power fail condition 134, a power restoral condition 134, a meter tamper condition 134, a power theft condition 134, and a last reading greater than a specified period of time condition 134.

In various embodiments, the rules 137 may be preconfigured and presented to an investigator via a network page 189 (FIG. 1). The network page 189 may comprise a user interface such as an online wizard that presents preconfigured rules 137 to an investigator. By preconfiguring a rule 137, the investigator may choose a rule 137 with default meter conditions 134. To this end, an investigator does not need to manually select meter conditions 134 to build a rule 137.

In some cases, rules 137 are generated by an investigator in response to receiving an instruction from an investigator to generate a rule 137. In this respect, an investigator may use a user interface of a network page 189 to build a rule 137 by selecting one or more meter conditions 134. The investigator may also select a preconfigured rule 137 using a wizard. However, in other embodiments, a rule 137 may be generated and implemented automatically. The rule 137 may be applied dynamically in response to a stimulus. A stimulus may be a trend in consumption data or it may be a particular meter usage circumstance. For example, consumption data of a customer may reflect trends of abnormal utility usage such as a drastic change in an amount of usage or an unusual amount usage at a particular time of day. Thus, unusual and/or unlawful activity may be reflected a customer's consumption history. In response to these trends, a rule 137 may be automatically applied to monitor the utility metering device 102 associated with the customer.

Similarly, the occurrence of a particular meter usage circumstance may trigger the automatic application of a rule 137. For example, a particular meter usage circumstance may be a transfer of utilities between a landlord and a tenant, a new customer being associated with a utility metering device 102, a decision of a customer to use a pre-pay payment function, or any other change to a customer account. For example, if a customer transitions to a pre-pay payment agreement, then it may be inferred that the customer has an increase in risk of financial hardship. Accordingly, a rule 137 may be automatically generated and applied to monitor meter theft or meter tampering for a utility metering device 102 associated with that customer.

Figure 3:
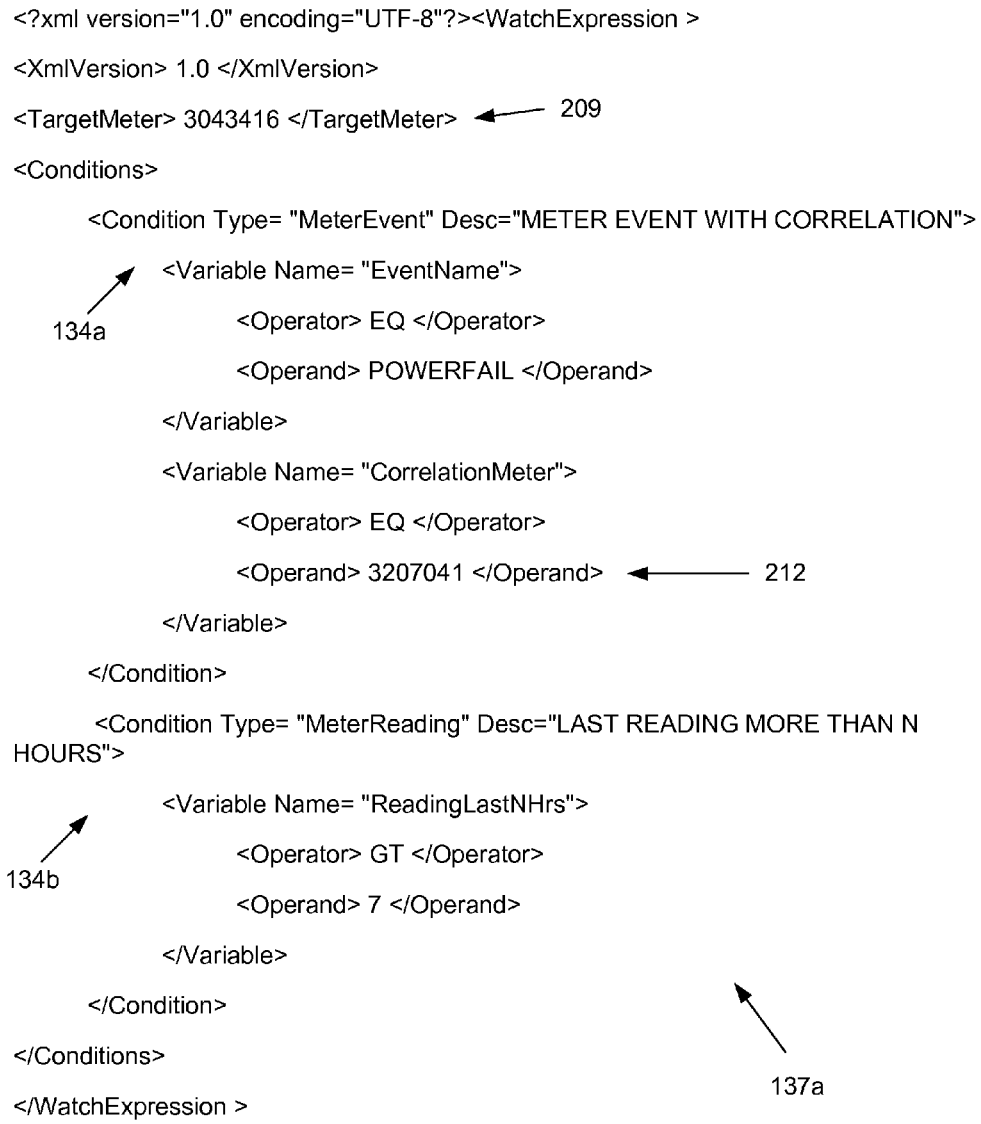
FIG. 3 is an example of a rule implemented in the utility metering and computing environment of FIG. 1, according to various embodiments of the present disclosure.

Moving to FIG. 3, shown is a rule 137a implemented in the utility metering and computing environment 100 of FIG. 1, according to various embodiments of the present disclosure. The rule 137a may be generated by a meter alert system 131 (FIG. 1) in response to information obtained from a user. The information may comprise, for example, a selection of one or more meter conditions 134, one or more parameters associated with the selected meter conditions 134, or any other user input. The meter alert system 131 may obtain the information via a user interface such as, for example, the user interface depicted in FIG. 2. The non-limiting example of FIG. 3 depicts a rule 137a that includes a first meter condition 134a and a second meter condition 134b. Specifically, the rule 137a is based on whether a power fail (with correlation) condition and/or a meter reading condition are satisfied.

The rule 137a is associated with a particular target utility metering device 102 that has a meter identifier 209 of "3043416." In this respect, the rule 137a is configured to specifically monitor the target utility metering device 102. The first meter condition 134a includes an operator of equal to (EQ) and an operand of a correlation meter identifier 212. The first meter condition 134a is satisfied if the target utility metering device 102 experiences a power fail condition and if the correlation utility metering device associated with the correlation meter identifier 212 also experiences a power fail condition.

The rule 137a includes a second meter condition 134b that is satisfied in response to the most recent meter reading for the target utility metering device 102 being greater than seven hours. In various embodiments, the rule 137a may comprise a Boolean operator such as "and" or "or" that operates on two or more meter conditions 134. The rule 137a may be satisfied if both the first meter condition 134a and the second meter condition 134b are satisfied or if either the first meter condition 134a or the second meter condition 134b is satisfied depending upon the Boolean operator.

Figure 4:
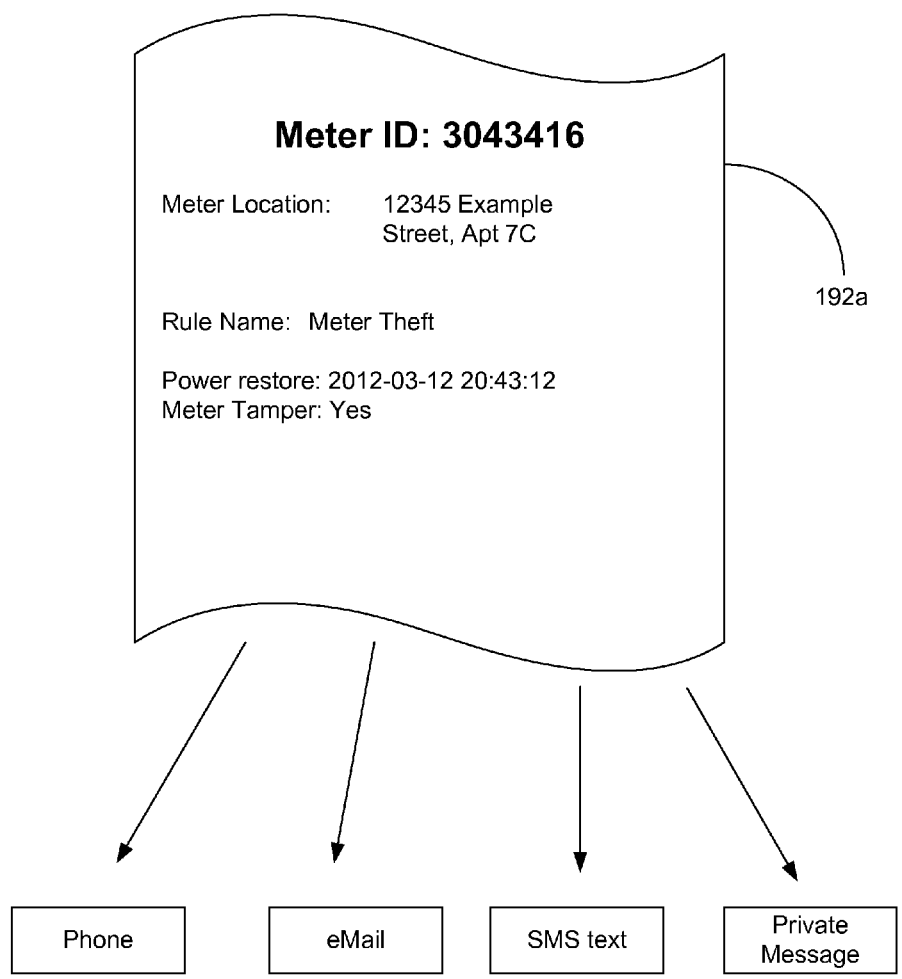
FIG. 4 is an example of a notification message generated in the utility metering and computing environment of FIG. 1, according to various embodiments of the present disclosure.

Turning now to FIG. 4, shown is an example a notification message 192a generated in the utility metering and computing environment 100 of FIG. 1, according to various embodiments of the present disclosure. The non-limiting example of the notification message 192a depicts a notification message that is generated in response to a particular rule 137 (FIG. 1) being satisfied. The rule 137 may be satisfied based at least in part on the satisfaction of one or more meter conditions 134 (FIG. 1) included in the rule 137. A meter alert system 131 facilitates the customized generation of the rule 137 and automatically executes the rule 137 to determine if and/or when the rule 137 is satisfied.

The notification message 192a may comprise information about the target utility metering device 102 such as, for example, the meter identifier 209 associated with the target utility metering device 102, a location of the target utility metering device 102, or customer information associated with the target utility metering device 102. In addition, the notification message 192a may include the name or identifier of the rule 137 that was satisfied and that caused the generation of the notification message 192a. The notification message 192a may include information relating to meter conditions 134 specified in the rule 137. Such information may comprise a listing of the meter conditions 134 that were satisfied or not satisfied, timestamps associated with the meter condition 134, parameters of the meter condition 134, or any other meter condition information.

The notification message 192a may be automatically generated and transmitted to an investigator according to destination information. A destination may be specified on behalf of an investigator to reflect those preferences of the investigator with regard to the receipt of a notification message 192a. For example, an investigator may desire receiving the notification message 192a via a phone call, e-mail, SMS text, or any other private message. The notification message 192a may be transmitted via a social media platform to the investigator. A social media channel may comprise, for example, a micro-blogging platform, a message board platform, an online forum, or any other interactive portal that associates a plurality of contacts with one another. Thus, the destination may be expressed in terms of a recipient identifier associated with the investigator such as, for example, a phone number, short code, long code, social media identifier, e-mail address, or any other user identifier. The meter alert system 131 may automatically generate the notification message 192a in response to a rule 137 being satisfied and automatically transmit the notification message 192a based on the preferences of the investigator. The notification message 192 may be transmitted over a cellular network, via an email system, or using a short messaging service (SMS).

Figure 5:
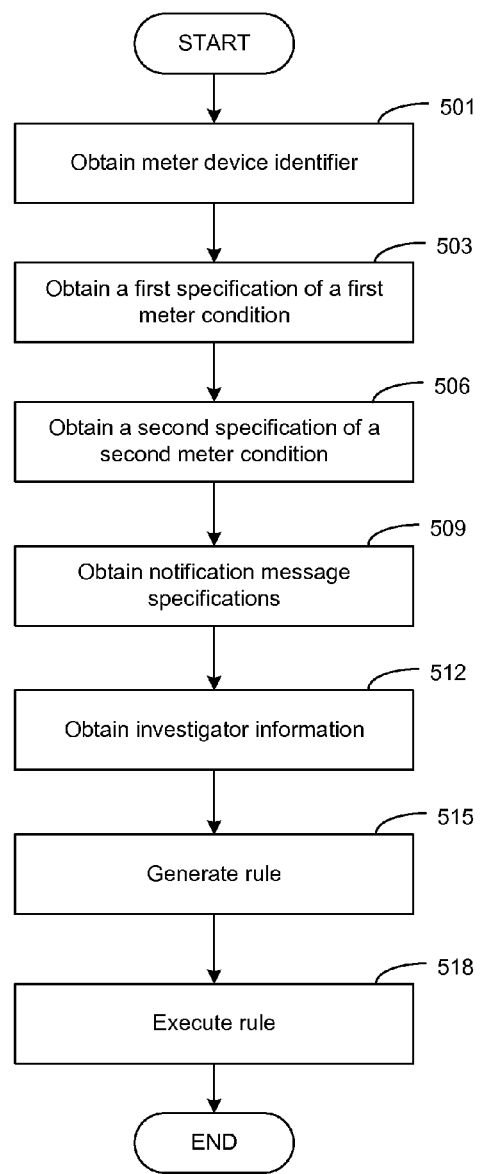
FIG. 5 is a flowchart illustrating one example of functionality implemented as portions of the meter alert system executed in the utility metering and computing environment of FIG. 1.

Referring now to FIG. 5, shown is a flowchart that provides one example of the operation of a portion of the logic executed by the meter alert system 131, according to various embodiments. It is understood that the flowchart of FIG. 5 provides merely an example of the many different types of functional arrangements that may be employed to implement the operation of the portion of the logic executed by the meter alert system 131 as described herein. As an alternative, the flowchart of FIG. 5 may be viewed as depicting an example of steps of a method implemented in the meter alert system 131 according to one or more embodiments. The non-limiting example of FIG. 5 depicts a meter alert system 131 that generates a rule 137 that has been customized on behalf of an investigator.

At 501, the meter alert system 131 obtains a meter identifier 209 (FIG. 2). The meter identifier 209 may be associated with a particular utility metering device 102 (FIG. 1) that an investigator desires to monitor. The meter identifier 209 may be obtained via a user interface such as, for example, the user interface depicted in FIG. 2. The meter alert system 131 may generate the user interface, encode the user interface, and transmit the encoded user interface to the client device 149 (FIG. 1) over a data network 144 (FIG. 1).

At 503, the meter alert system 131 obtains a first specification of a first meter condition 134 (FIG. 1). The meter alert system 131 may obtain the first specification via the user interface. In various embodiments, the first meter condition 134 is specified along with one or more parameters such as, for example, operators and/or operands. An operand may be, for example, a threshold amount of utility resources used, a threshold duration of time, a percentage, or any other threshold or tolerance. An operand may also be a value of a correlation meter identifier 212 (FIG. 2). At 506, the meter alert system 131 obtains a second specification of a second meter condition 134 (FIG. 1). The meter alert system 131 may obtain the second specification via the user interface. In various embodiments, the second meter condition 134 is specified along with one or more parameters.

At 509, the meter alert system 131 obtains one or more notification message specifications. A notification message specification may comprise any information relating to a manner or a circumstance of notification message generation and transmission. For example, the notification message specification may comprise a destination, an address 225 (FIG. 2), a start time 215 (FIG. 2), a stop time 218 (FIG. 2), a notification schedule 221 (FIG. 2), or any other information relating to the generation or transmission of the notification message 192 (FIG. 1).

At 512, the meter alert system 131 obtains investigator information 142 (FIG. 1). Investigator information they comprise, for example, an investigator identifier 223 (FIG. 2) or any other information relating to the preferences of an investigator.

At 515, the meter alert system 131 generates a rule 137. The rule 137 comprises at least the first meter condition 134 and the second meter condition 134. In addition, the rule 137 may comprise any parameters associated with the first meter condition 134 or second meter condition. The rule 137 may be formatted as an extensive markup language (XML) document or any other format, as depicted in the non-limiting example of FIG. 3. The rule 137 may be stored in the data store 127 (FIG. 1) of a computing device 123 (FIG. 1). Thus, the rule 137 includes conditions, variables, and/or parameters that have been selected or otherwise identified by a user on behalf of an investigator.

At reference number 518, the meter alert system 131 executes the rule 137. By executing the rule 137, the meter alert system 131 determines if and/or when the terms of the rule 137 are satisfied in response to meter data 146 (FIG. 1) received over the data network 144 (FIG. 1).

Figure 6:
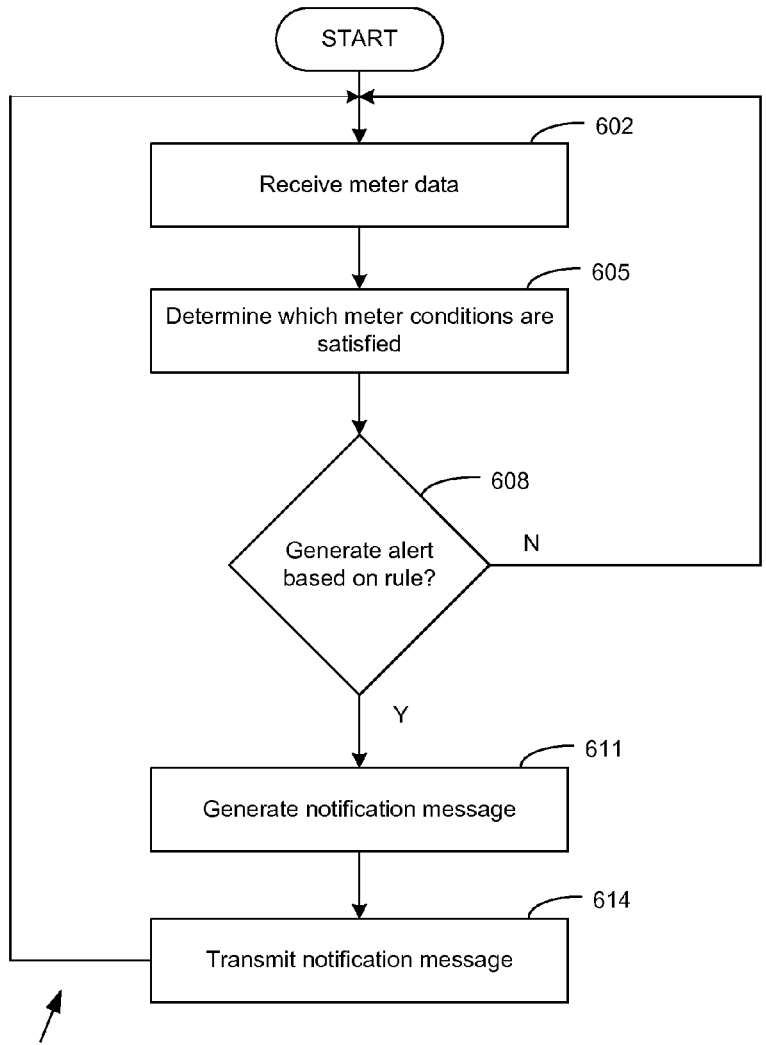
FIG. 6 is a flowchart illustrating one example of functionality implemented as other portions of the meter alert system executed in the utility metering and computing environment of FIG. 1.

Turning now to FIG. 6, shown is a flowchart that provides one example of the operation of another portion of the logic executed by the meter alert system 131, according to various embodiments. It is understood that the flowchart of FIG. 6 provides merely an example of the many different types of functional arrangements that may be employed to implement the operation of another portion of the logic executed by the meter alert system 131 as described herein. As an alternative, the flowchart of FIG. 6 may be viewed as depicting an example of steps of a method implemented in the meter alert system 131 according to one or more embodiments. The non-limiting example of FIG. 6 depicts a meter alert system 131 that executes a rule 137.

At 602, the meter alert system 131 receives meter data 146 (FIG. 1). Meter data 146 may be received via a data network 144 (FIG. 1) from one or more meter network interfaces 109 (FIG. 1). Meter data 146 may comprise, for example, meter readings, utility metering device identifiers, status information regarding one or more utility metering devices 102, or any other information relating to one or more utility metering devices 102. In some embodiments, the meter data 146 may comprise an indication of whether a particular utility metering device 102 has satisfied one or more meter conditions 134. Alternatively, the determination of whether a particular utility metering device 102 has satisfied one or more meter conditions 134 may be made by the meter alert system 131 or by any other application executed in the computing device 123 (FIG. 1). Thus, for each meter condition 134 within the list of meter conditions, the computing device 123 may determine whether the meter condition 134 is satisfied for any of the utility metering devices 102.

At 605, the meter alert system 131 determines which meter conditions 134 of a particular rule 137 are satisfied. The satisfaction of a rule 137 is dependent upon the satisfaction of those meter conditions 134 included in the rule 137. At 608, the meter alert system 131 determines whether to generate an alert based at least in part on the rule 137. For example, the meter alert system 131 may determine if meter conditions 134 are satisfied and whether those satisfied meter conditions 134 render the rule 137 satisfied. If a particular rule 137 requires that three conditions each be satisfied, then the meter alert system 131 generates an alert if each of the meter conditions 134 is satisfied.

If an alert is not generated, then the meter alert system 131 branches to the beginning of the flowchart of FIG. 6 and continues receiving meter data 146. If an alert is generated, then the meter alert system 131 generates a notification message 192 (FIG. 1) as shown at 611. The notification message 192 may be similar to the notification message 192a of the non-limiting example of FIG. 4.

At 614, the meter alert system 131 transmits the notification message 192. The meter alert system 131 may transmit the notification message 192 according to investigator information 142 and/or destination information. For example, the meter alert system 131 may associate a particular rule 137 with an investigator identifier 223 (FIG. 2) and may also associate the particular rule 137 with a destination or an address 225 (FIG. 2).

Figure 7:
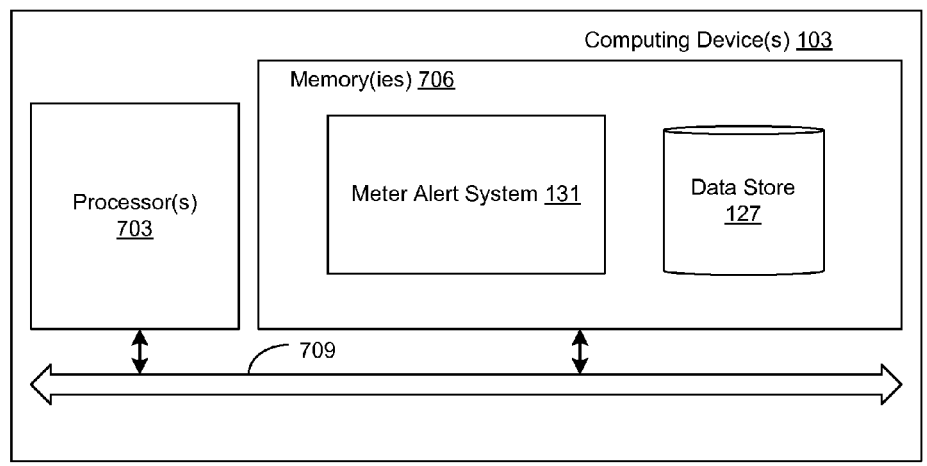
FIG. 7 is a schematic block diagram that provides one example of a computing device in which the meter alert system of FIG. 1 may be implemented, according to various embodiments of the present disclosure.

With reference to FIG. 7, shown is a schematic block diagram of a computing device 103 according to various embodiments of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is a meter alert system 131. Also stored in the memory 706 may be data stored in the data store 127 (FIG. 1).

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits. In such a case, the local interface 709 may be an appropriate network that facilitates communication between any two of the multiple processors 703, between any processor 703 and any of the memories 706, or between any two of the memories 706. The local interface 709 may comprise additional systems designed to coordinate this communication, including, for example, performing load balancing. The processor 703 may be of electrical or of some other available construction.

Although the meter alert system 131 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application-specific integrated circuits having appropriate logic gates, or other components. Such technologies are generally well known by those skilled in the art and, consequently, are not described in detail herein.

The flowcharts of FIGS. 5 and 6 show the functionality and operation of an implementation of portions of the meter alert system 131. If embodied in software, each reference number, depicted as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein for purposes of enhanced utility, accounting, performance measurement, or providing troubleshooting aids. It is understood that all such variations are within the scope of the present disclosure.

Also, any logic or application described herein, including the meter alert system 131, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM), dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying an application executable in a computing device, wherein the application, when executed, causes the computing device to at least:
   identify a first utility metering device associated with a user account based at least in part on the user account transitioning to a pre-payment agreement;
   determine a utility metering device identifier of the first utility metering device, the first utility metering device being operable to monitor consumption of a resource;
   determine a correlation utility metering device identifier associated with the utility metering device identifier, the correlation utility metering device identifier being associated with a second utility metering device located within a predefined distance from the first utility metering device;
   determine a first specification of a first meter event among a list of meter events, wherein the list of meter events comprises at least one of a missing meter event, a meter swapping event, and a meter bypassed by jumper event;
   determine a second specification of a second meter event based at least in part on a metering consumption exceeding a threshold;
   generate a rule for the utility metering device identifier that comprises a pattern of a plurality of meter conditions for the first utility metering device, the pattern of the meter conditions being determined based at least in part on the first meter event and the second meter event;
   execute the rule to generate a respective notification message in response to the pattern of the meter conditions being satisfied for both the utility metering device identifier and the correction utility metering device identifier; and
   transmit the notification message to a destination.

2. The non-transitory computer-readable medium of claim 1, wherein transmitting the notification message to the destination comprises causing the computing device to transmit the notification message using one of a telephone number, an SMS message, or an e-mail address.

3. The non-transitory computer-readable medium of claim 1, wherein determining the first specification of the first meter event further comprises determining a threshold parameter associated with the first meter event, the first meter event comprising an unusual amount of usage at a particular time of day.

4. The non-transitory computer-readable medium of claim 1, wherein the pattern of the meter conditions of the utility metering device is satisfied based at least in part on a power restoral correlation meter condition and a power failure correlation meter condition of the correlation utility metering device being satisfied,
  wherein a power restoral correlation meter condition is the detected power restoration by both the first utility metering device and the second utility metering device located within a predefined distance from the first utility metering device, and
  wherein a power failure correlation meter condition is the detected power failure by both the first utility metering device and the second utility metering device located within a predefined distance from the first utility metering device.

5. The non-transitory computer-readable medium of claim 1, wherein the pattern of the meter conditions comprises at least two of a meter error condition, the meter error condition being at one of a meter tamper error condition, a meter rotation error condition, a meter memory error condition, a power fail condition, power restored condition, reading received condition, a last reading older than a last reading threshold condition, consumption exceeding a consumption threshold condition, check meter condition, or a cyclic redundancy check error condition.

6. The non-transitory computer-readable medium of claim 1, wherein the application further causes the computing device to generate a user interface that receives the first specification of the first meter event.

7. A system, comprising:
  at least one computing device; and
  at least one application executable in the at least one computing device, the at least one application causing the at least one computing device to:
    identify a first utility metering device associated with an account of a user based at least in part on the user transitioning to a pre-payment agreement and a consumption history of the user;
    determine a correlation utility metering device identifier associated with the first utility metering device, the correlation utility metering device identifier being an identifier of a second utility metering device located within a predefined distance from the first utility metering device, the first utility metering device being operable to monitor consumption of a resource;
    determine a first specification of a first meter event among a list of meter events, wherein the list of meter events comprise at least one of a missing meter event, a meter swapping event, and a meter bypassed by jumper event;
    determine a second specification of a second meter event based at least in part on the consumption history of the user;
    dynamically generate a rule that comprises a pattern of a plurality of meter conditions for the first utility metering device, the pattern of the meter conditions being determined based at least in part on the first meter event and the second meter event in response to identifying the first utility metering device, wherein the rule is dynamically generated using a utility metering device identifier of the first utility metering device and the correlation utility metering device identifier of the correlation utility metering device; and
    execute the rule to generate a respective notification message in response to the pattern of the meter conditions being satisfied for both the utility metering device identifier and the correction utility metering device identifier.

8. The system of claim 7, wherein the at least one application further causes the computing device to associate the rule to an investigator identifier.

9. The system of claim 7, wherein the first meter event is one of a power restoration event or a power failure event.

10. The system of claim 7, wherein the at least one application further causes the computing device to track, for each first meter event within the list of meter events, whether the first meter event is detected for the first utility metering device.

11. The system of claim 7, wherein the rule comprises a Boolean operator that operates on the meter conditions.

12. A method, comprising:
  obtaining, via a user interface, a first specification of a first meter event among a list of meter events, wherein the list of meter events comprises at least one of a missing meter event, a meter swapping event, and a meter bypassed by jumper event;
  identifying a first utility metering device associated with an account of a user based at least in part on the user transitioning to a pre-payment agreement and a consumption history of the user;
  determining a correlation utility metering device identifier associated with the first utility metering device, the correlation utility metering device identifier being an identifier of a second utility metering device located within a predefined distance from the first utility metering device, the first utility metering device being operable to monitor consumption of a resource;
  determining a second specification of a second meter event based at least in part on the consumption history of the user;
  in response to identifying the first utility metering device and the correlation utility metering device identifier, dynamically generating a rule that comprises a pattern of a plurality of meter conditions for the first utility metering device, the pattern of the meter conditions being determined based at least in part on the first meter event and the second meter event, the pattern comprising a sequence of the metering conditions and a threshold associated with one of the metering conditions, wherein the rule is dynamically generated using a utility metering device identifier of the first utility metering device and the correlation utility metering device identifier of the correlation utility metering device;
  executing the rule, wherein an execution of the rule generates an alert in response to the pattern of the meter conditions being satisfied for both the utility metering device identifier and the correction utility metering device identifier; and
  transmitting a respective notification message in response to the alert being generated.

13. The method of claim 12, further comprising inserting an additional meter event into the list of meter events.

14. The method of claim 12, further comprising:
  obtaining, via the user interface, an investigator identifier of an investigator; and
  associating the investigator identifier with the rule.

15. The method of claim 12, wherein obtaining the first specification of the first meter event comprises obtaining a threshold amount associated with the first meter event, the threshold amount comprising one of a power usage or a duration of time.

16. The method of claim 12, wherein the rule is generated to detect theft of the first utility metering device.

17. The method of claim 12, further comprising:
in response to obtaining an input by an administrator via a second user interface, generating a new meter condition; and
inserting the new meter condition into the pattern of the meter conditions.

18. The method of claim 12, wherein the pattern of the meter conditions being determined is further based at least in part on a meter usage circumstance.

\* \* \* \* \*